(12) United States Patent
Sekiguchi et al.

(10) Patent No.: US 7,107,274 B2
(45) Date of Patent: Sep. 12, 2006

(54) METHOD FOR STORAGE MANAGEMENT OF STORAGE RESOURCE ON A STORAGE NETWORK

(75) Inventors: Shihoko Sekiguchi, Sagamihara (JP); Yasunori Kaneda, Sagamihara (JP); Satoshi Miyazaki, Yamato (JP)

(73) Assignee: Hitachi, Ltd., Tokyo (JP)

( * ) Notice: Subject to any disclaimer, the term of this patent is extended or adjusted under 35 U.S.C. 154(b) by 288 days.

(21) Appl. No.: 10/066,660

(22) Filed: Feb. 6, 2002

(65) Prior Publication Data

US 2003/0084076 A1 May 1, 2003

(30) Foreign Application Priority Data

Oct. 31, 2001 (JP) ............................. 2001-333673

(51) Int. Cl.
*G06F 17/30* (2006.01)
(52) U.S. Cl. ....................... 707/100; 707/205; 707/200
(58) Field of Classification Search ................ 707/100, 707/104.1, 200, 205; 714/7, 6; 709/217, 709/328, 225
See application file for complete search history.

(56) References Cited

U.S. PATENT DOCUMENTS 6,792,463 B1 * 9/2004 Lamberton et al. ......... 709/227

2001/0056416 A1 * 12/2001 Garcia-Luna-Aceves ....... 707/2
2004/0073831 A1 * 4/2004 Yanai et al. .................. 714/7

OTHER PUBLICATIONS

Yanai et al. Continuation of U.S. Appl. No. 09/709,814, filed on Nov. 10, 2000, now Pat. No. 6,502,205.*

* cited by examiner

*Primary Examiner*—Jeffrey Gaffin
*Assistant Examiner*—Neveen Abel-Jalil
(74) *Attorney, Agent, or Firm*—Mattinlgy, Stanger, Malur & Brundidge, P.C.

(57) ABSTRACT

A storage resource operation managing method in a storage network arranged by a node for transmitting an access request via a network to a storage and by a plurality of storage groups which receive the access request so as to execute a content of the access request includes the following steps, a logical distance defined from the node to the storage resource is acquired, alternatively, geographical distances among the respective storage resources are acquired, alternatively, in such a case that both the logical distance and the geographical distance are acquired, requests with respect to the respective distances are acquired, and a storage resource is selected, an acquired requirement range is entered into a selection factor so as to select a desirable storage resource.

18 Claims, 13 Drawing Sheets

FIG. 4

600 STORAGE RESOURCE INFORMATION TABLE

| STORAGE NAME/LUN | OPERATION RATIO (%) | CAPACITY (GB) | ROTATION PER MINUTE OF DISK (rpm) | ACCESS TIME WITHIN DISK (msec) | PACKET RESPONSE TIME (sec) | INSTALLATION PLATE (NORTH LATITUDE/ EAST LONGITUDE) | DISTANCE (Km) | TOTAL HOP NUMBER |
|---|---|---|---|---|---|---|---|---|
| STORAGE A /LUN 0 | 10 | 1500 | 15000 | 7 | 1.5 | 36/140 TOKYO | 0 | 0 |
| STORAGE A /LUN 2 | 25 | 500 | 15000 | 7 | 1.6 | 36/140 TOKYO | 0 | 0 |
| STORAGE B /LUN 0 | 5 | 2000 | 20000 | 5.5 | 1000 | 34/135 OSAKA | 300 | 1 |
| 601 | 602 | 603 | 604 | 605 | 606 | 607 | 608 | 609 |

METHOD FOR STORAGE MANAGEMENT OF STORAGE RESOURCE ON A STORAGE NETWORK

BACKGROUND OF THE INVENTION

The present invention generally relates an operation management technique of an SSP (Storage Service Provider) which owns a storage network, namely a SAN (Storage Area Network) and a plurality of NASs (Network Attached Storages), and provides a storage region (storage resource) to a client, while the storage network is constituted by coupling a plurality of storages with a plurality of servers in a high speed. More specifically, the present invention relates to a storage resource selection technique, a disaster recovery technique, and a cost reduction technique, which are met with requirements of clients under optimum condition.

Conventionally, storage devices have been used as appendix articles, namely external storage units of servers such as disk devices and tape apparatus. However, in connection with importance of information as well as extensions of storage capacities, data exchanges and data sharing are required among a plurality of systems. As a result, NASs (Network Attached Storages) having large capacity storages, a common carrier leased network which couples a storage group to a server group in a high speed, and SANs (Storage Area Networks) have been popularized. In such an SAN, storage consolidation is realized by employing a server group and a storage group, so that higher efficiencies of system operation may be realized.

Generally, a storage administrator within an enterprise uses a management tool in order to manage topology of an SAN, and also to operate/manage connections between NAS appliances and a server.

In accordance with a management tool, various information such as capacities, empty capacities, and network topology related to storages and servers are acquired, and then servers, storages, and network appliances, which are connected to an SAN are displayed on a display screen. Since icons related to the respective appliances are clicked on the screen, more detailed information (for example, capacities of respective storages and states of storage assignment to servers) can be displayed on the display screen. Then, not only the management information is acquired/displayed, but also storages and logical areas within storages are allocated to the server, and these allocations are deleted, or changed. Also, since back-up setting operation/back-up tool are combined with the above-described management tool, utilization of a system may be effectively increased.

However, storage operation administrators employed in enterprises are facing to various problems, for instance, increases of cost with respect to increases of storages which are not predictable in recent years, complex structures of management tools in various fields, space saving aspects of installation spaces for storages. These problems may be solved in such a manner that while information resources owned within enterprises are transferred in an outsourcing manner to such an enterprise which exclusively operates/manages storages, all of storage operations/managements are consigned to an external enterprise. As such an enterprise which operates/manages storages and lends storage resources to clients, an SSP (Storage Service Provider) is known (see "Data Storage Report 2000" of Japanese monthly magazine "Computopia", on pages 36 to 37).

FIG. 13 is a network structural diagram for indicating operation modes of an SSP (Storage Service Provider) 103.

A client who wants to consign information resources provided within the own enterprise (firm) in an outsourcing manner installs a customer's server 108 corresponding to the server of the own firm within the SSP 103, and accesses from a customer's console 100 installed in the own firm to the customer's server 108 of the own firm. The SSP 103 is constituted by a storage device (106, 107), an SAN 105, and a customer's server group (108, 109, 110). All of nodes which are connected to the SAN 105 are managed by a management server 104. The SAN 105 is arranged by a fiber channel, the Ethernet, or the like. Both the customer's console 100 and the customer's server 108 corresponding to the server of the own firm are connected to each other by way of either an NFS (Network File System) or a CIFS (Common Internet File System), or by way of a common carrier leased line, while using a VPN (Virtual Private Network) 101 on the Internet 102. The customer's console 100 is connected via the Internet 102 to the management server 104.

In the SSP 103, in such a case that a storage area allocation request is issued from the client via the customer's console 100, the SSP 103 interrogates access performance, reliability, usage, and the like, which correspond to the request of the client with respect to the storage, from the customer's console 100, and then selects such a storage resource which is fitted to the request. When the storage resource is selected, the SSP 103 uses a management tool. The management tool continuously acquires from the storage, a value indicative of a state of a storage resource (will be referred to as "resource state information" hereinafter), while this resource state information corresponds to an operation state of a storage resource, a use condition thereof, and a throughput thereof. While the above-described resource state information is used as a selection factor, the SSP 103 selects such a storage resource fitted to the request of the client 100 from the resource state information.

Next, the SSP 103 assigns the selected storage resource to the customer's server 108. In order to assign a storage resource to the server 108, the previously existing SAN topology management tool, and a volume management tool contained in a storage may be used. Since the above-described storage resource is assigned, the customer's console 100 may use the storage resource which satisfies the performance request in the customer's server 108. Also, information saved in the customer's server 108 may be viewed, set, and changed from the customer's console 100.

FIG. 14 is a flow chart for describing a process operation of a storage resource assignment to the customer's server 108.

In this flow chart, the SSP 103 has continuously acquired resource state information 200 contained in the storage, such as an operation ratio, a load ratio, an empty storage, an RAID level, DISK performance, and the like as to the storage (step 201). Under this condition, in such a case that the SSP 103 receives both a rental request of a storage region, and a request 202 related to a capacity and performance with respect to a storage resource from the customer's console 100 (step 203), this SSP 103 selects such storage resource which is fitted to the request of the client, while using the previously-acquired resource state information 200 as a selection factor (step 204). Then, the SSP 103 assigns the selected storage to the customer's server 108 (step 205). To assign this selected storage resource, the presently-existing SAN topology management tool, or the assignment tool for the volume within the storage is used.

The SSP 103 notifies such a fact that the storage resource is usable via the management server 104 to the customer's console 100 (step 206).

Also, the SSP 103 copies necessary data as back-up data with respect to the storage resource used by the customer's server 108 in order to recover the necessary data when a trouble happens to occur. In this case, in order that the back-up data is not deleted at the same time due to the occurrence of trouble, while another storage device different from the storage device used by the client is secured, the SSP 103 copies the data stored in the storage resource.

In the above-described prior art, the following mode is represented. That is, while the SSP 103 owns the servers 108, 109, 110 of the clients within the SSP 103, the SSP 103 causes the customer's servers to use the SAN 105. However, there is another mode. That is, in the SSP 103, a network is connected from the SAN 105 provided in the SSP 103 is directly connected to a customer's firm, so that the SSP 103 may provide a storage service. In this alternative case, the customer's server 108 shown in FIG. 1 may become a network structure which is located at the place of the customer's console indicated in FIG. 13.

As previously described, in the prior art, either the management tool or the storage administrator selects such a storage resource which is fitted to both the capacity and the performance requested by the client based upon the resource state information of the storage resource, and thus, may realize the assignment of the selected storage resource to the customer's server. Also, since the data stored in the storage resource are copied as the back-up data, the high utility of the SSP may be maintained.

In the conventional technique, while resource state information (operation condition, capacity, use condition, throughput and the like as to storage resource) within each of storages, which is obtained from the management tool, is used as a selection factor, such a storage resource is selected and allocated to a client, which can satisfy both a capacity and access performance of a storage requested by this client.

However, in such an SSP which may unitedly provide resources and NASs on an SAN, distributed in long distances, to a client by using a wide area network (WAN), a large number of composite networks are used in the SSP. In such a network, network access time between the storage resource and the customer's server may give an influence to access performance to a storage. As a result, only such resource state information (operation ratio, disk performance, and the like) corresponding to a factor for determining access performance within the storage resource can hardly satisfy entire access performance which is required by the client.

Furthermore, in the case that while storages which are broadened and distributed over long distances are effectively utilized, and also back-up operation capable of solving disaster problems such as an earthquake is carried out, positional information such as installation areas of storage units is not acquired in the presently available management tool. As a consequence, this presently available management tool owns no means capable of intentionally selecting storage units which are located far from a designated distance.

Also, in the case that a client which utilizes an SSP moves, since network access time required from a move destination to a storage resource is not considered, there are some possibilities that data is transferred to such a storage located near the move destination of the customer's server. Under such a circumstance, work cost required to transfer the above described data is necessarily required every time the client moves.

SUMMARY OF THE INVENTION

An object of the present invention is given as follows: That is, in a storage management system capable of providing a storage resource to a client, a selection is made of such a storage resource which can satisfy not only storage resource performance, but also network access performance defined from a node used by the client up to the storage resource in response to a request issued from the client.

Then, this object of the present invention is to provide such a storage resource operation managing method capable of providing to the client, an optimum storage resource which is fitted to the request of the client. It should be understood that information such as a total hop count, packet response time, and a network throughput, which is related to network access performance from a node to a storage resource, network access performance between storage resources, or network access performance between nodes will be referred to as a "logical distance" hereinafter. This total hop count corresponds to a number for indicating how many stages of routers are used in a communication.

Another object of the present invention is to provide a disaster-resistant performance improving method used when regional disaster such as an earthquake happens to occur in such a manner that a plurality of storage resources which are separated far from an intentionally set distance are selected from storage resources distributed in a broad area, and then, the selected storage resources are copied in a back-up manner.

A further object of the present invention is to provide a method of reducing work cost related to movement of a storage resource and/or data stored in a storage resource as follows: That is, in such a case that a geographical distance between a node accessed to a storage resource and this storage resource is changed, if a logical distance defined from the node up to the storage resource after the geographical distance has changed can satisfy a request of a client with respect to access performance, then movement of the storage resource is not carried out, or movement of the data stored in the storage resource is not carried out.

In order to achieve the above-described objects, the present invention may provide such a method for managing storage resources, while using both information related to network access performance defined from a node which uses a storage resource up to this storage resource, and information related to a geographical location relationship between the above-described node and storage resource, and also among the respective storage resources. The first-mentioned network access performance information will be referred to as a "logical distance" hereinafter, whereas the last-mentioned geographical location positional relationship information will be referred to as a "geographical distance" hereinafter. Also, according to the present invention, both a disaster-resistant performance improving method and a work cost reducing method may be provided.

Concretely, the below-mentioned methods (1) to (7) may be provided.

(1) Storage Resource Operation Managing Method:

A network is arranged by a node for transmitting an access request via the network to a storage, and also, a plurality of storage groups which receive the access request to execute this received access request.

In this network structure, any one of a logical distance and a geographical distance is acquired, or both the logical distance and the geographical distance are acquired. The logical distance is defined between the above-described node and a storage resource contained in the storage group, or between the respective storage resources contained in the storage resource groups. The geographical distance is defined between the node and the storage resource, or between the respective storage resources contained in the storage resource groups. Furthermore, while a request with respect to the acquired distances is acquired, a requirement range is set as a selection factor used when a storage resource is selected.

In accordance with this managing method, while not only performance of the storage resource itself, but also the logical distance defined from the node used to access the storage up to the storage resource, and further, the geographical distance between the storages are considered, the desirable storage resource can be selected from the storage network distributed, or spread in a wide ares. As a consequence, such a storage resource operation managing method can be provided by which an optimum storage resource can be provided to the clients which utilize the storages.

(2) Method of Selecting Optimum Storage Resource:

In the above-described managing method (1), either the logical distance or the geographical distance is acquired. Otherwise, both the logical distance and the geographical distance are acquired. Furthermore, while the request for the acquired distances is acquired, the requirement range is set as the selecting condition of the storage resource. Then, such a storage resource whose logical distance is located within the requirement range is selected. Alternatively, another storage resource whose geographical distance is located within the requirement range is selected. Otherwise, such a storage resource whose logical distance and geographical distance are located within the requirement range is selected.

(3) Method of Selecting Optimum Storage Resource:

In such a case that there are plural storage resources which are installed within the requirement range shown in the above-explained selecting method (2) in accordance with this selecting method (2), a further optimum storage resource is selected by using the following conditions, namely, a storage resource whose logical distance is the shortest distance; a storage resource whose geographical distance is the shortest distance; a storage resource whose geographical distance is the longest distance; a storage resource whose logical distance and geographical distance are either the shortest distances, or the longest distances; or any one of these selecting conditions among the storage resources located within the requirement range.

(4) Method of Selecting Optimum Storage Resource:

In such a case that such a storage resource cannot be found out which is installed within the requirement range shown in the above-described selecting method (2) in accordance with this selecting method (2), an optimum storage resource is selected from all of storage resources, while using the following selecting conditions, namely, the storage resource whose logical distance in the above selecting method (2) is the shortest distance; the storage resource whose geographical distance in the above selecting method (2) is the shortest distance; the storage resource whose geographical distance in the above selecting method (2) is the longest distance; the storage resource whose logical distance and geographical distance in the above selecting method (2) are either the longest distances or the shortest distances; or any one of these selecting conditions.

(5) Method of Forming Optimum Storage Resource:

In such a case that such a storage resource cannot be found out which is installed within the requirement range shown in the above selecting method (2) in accordance with this selecting method (2), such a storage resource whose logical distance shown in the above selecting method (2) is located within the requirement range is newly added; such a storage resource whose geographical distance shown in the above selecting method (2) is located within the requirement range is newly added; or such a storage resource whose logical distance and geographical distance are located within the requirement range of the above method selecting (2) is newly added.

Similar to the above-explained managing method (1), in accordance with the above-described selecting/forming methods (2) to (5), such a storage resource operation managing method can be provided by which the optimum storage resource can be provided to such a node indicative of the request with respect to the storage resource.

(6) Disaster-Resistant Performance Improving Method:

With respect to such a storage resource located in the network shown in the above managing method (1), a requirement range as to a geographical distance thereof is acquired in accordance with the method shown in the above-described selecting method (2) (this storage resource will be referred to as a "primary resource" hereinafter). Then, another storage resource (will be called as a "secondary resource" hereinafter) is selected which is installed in the set requirement range and is different from the primary resource. Either a data portion or all of the data stored in the primary resource is duplicated, and then, the duplicated data is stored into the secondary resource. Then, in such a case that the primary resource cannot be used due to an occurrence of a certain trouble, the access request which is issued from the node for transmitting the access request with respect to the primary resource is executed in the secondary resource.

In accordance with this disaster-resistant performance improving method, the data stored in the storage resource can be saved in the back-up manner at a position which is intentionally separated far from the present position thereof. As a consequence, the data stored in the storage resource can be maintained with respect to such disaster which locally happens to occur, and therefore, disaster recovery operation can be realized.

(7) Cost Reducing Method:

With respect to both a node and a storage resource, which are located within the network shown in the above-described managing method (1), a request for a logical distance is acquired based upon the selecting method indicated in the above selecting method (2). In the case that a geographical location of this node is moved, a judgement is made as to whether or not a logical distance defined from this node up to the storage resource is located within the acquired requirement range even after this geographical location has been moved. When the logical distance is located within the requirement range, movement of the storage position of the data within the storage resource is not carried out.

In accordance with this cost reducing method, in such a case that a server of a customer which uses a storage is moved, for instance, this server positionally moves, it is possible to check as to whether or not network access performance defined from the server up to a storage resource achieved after this server has moved is changed, as compared with such network access performance achieved before this server moves. Then, when the network access performance is located within such a performance range requested by the client, it is possible to judge that movement of data is not required. As a consequence, such cost required in data movement can be reduced in the storage resource operation management.

BRIEF DESCRIPTION OF THE DRAWINGS

For a better understanding of the present invention, reference is made of a detailed description in conjunction with the accompanying drawings, in which:

FIG. 4 is a diagram for representing a storage resource information table contained in a database 501 formed in the management server 303;

DESCRIPTION OF THE EMBODIMENTS

Now, a description is made of a first embodiment mode of the present invention.

Figure 1:
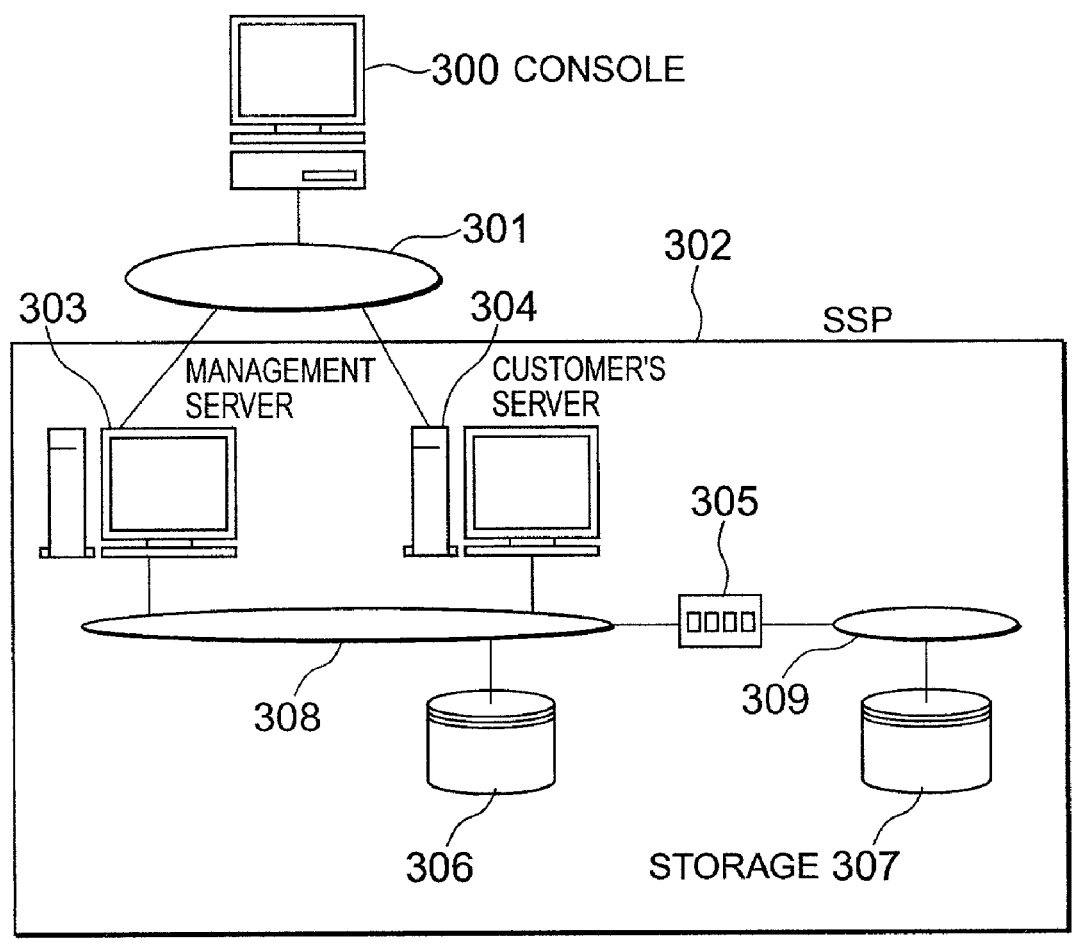
FIG. 1 is a network structural diagram for indicating an operation mode of an SSP 302 to which a first embodiment mode of the present invention is applied.

FIG. 1 is a network structural diagram for indicating an operation mode of an SSP 302 to which a first embodiment mode of the present invention is applied.

In this network structure, a console 300 indicates a console node of a client to which an information resource contained in an enterprise is consigned in an outsourcing manner. The client installs a customer's server 304 corresponding to a server of the own enterprise (firm) within the SSP 302, and this client sets/changes an application program stored in the customer's server 304, and acquires information from the console 300. The console 300 installed within the client's firm may access the customer's server 304 connected to the SSP 302 via the Internet 301 on a network connected to a VPN (Virtual Private Network) by way of an NFS (Network File System).

The SSP 302 is constituted by a management server 303, the customer's server 304, storage units 306 and 307, and also a router 305. The management server 303, the customer's server 304, the storage unit 306, and the router 305 are connected to each other in a LAN (Local Area Network) manner by using an Ethernet 308. Also, the storage unit 307 is connected to the router 305 in a LAN manner by employing another Ethernet 309. Routing operation is carried out between the LAN 308 and the LAN 309 by the router 305. In the network structure of FIG. 1, the LAN connections among the storage units 306/307, the management server 303, and the customer's server 304 are established by employing the Ethernet and the router. However, this connection method is not limited only to this network structure. Alternatively, while the storage units are connected to customer's servers by employing fiber channels and the like, these fiber channels may be connected to each other by using fiber channel switches. Also, according to the present invention, there is no limitation in total numbers as to all of these console, customer's server, management server, router, and storage units. Also, there is no limitation in total stages as to these routers. Further, the network topology between the console 300 and the nodes within the SSP 302 is not limited only to the Internet, but may be established by either a common carrier leased line or an ATM.

In the above-described network structure, in the case that the client issues an assignment request for a logical area within a storage unit to the management server 303 of these SSP 302 by using the console 300, the management server 303 selects such a logical area which is fitted to the request of the client as to the storage area, and then assigns, or allocates the selected logical area to the customer's server 304. In this first embodiment, it should be understood that the above-described storage units, a geographically-divided area within the storage unit, a logically-divided area within the storage unit, and a logically-divided area which is formed over a plurality of storage units will be referred to as a "storage resource." After the management server 303 allocates a storage resource, this management sever 303 notifies an address of the customer's server 304 to the console 300 so as to establish both an access operation from the console 300 to the customer's server 304, and another access operation from the customer's server 304 to the storage resource.

Subsequently, the console 300, the customer's server 304, and the management sever 303 will be successively explained with reference to FIG. 2A, FIG. 2B, FIG. 3, and FIG. 4.

Figure 2A:
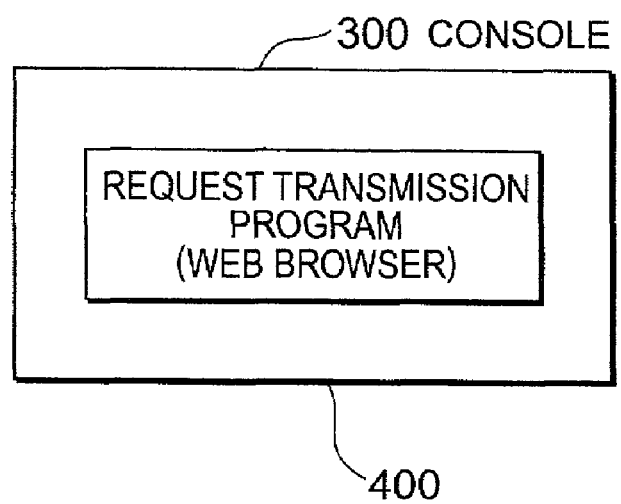
FIG. 2A and FIG. 2B are diagrams for schematically representing a customer's console 300 and a customer's server 304.
Figure 2B:
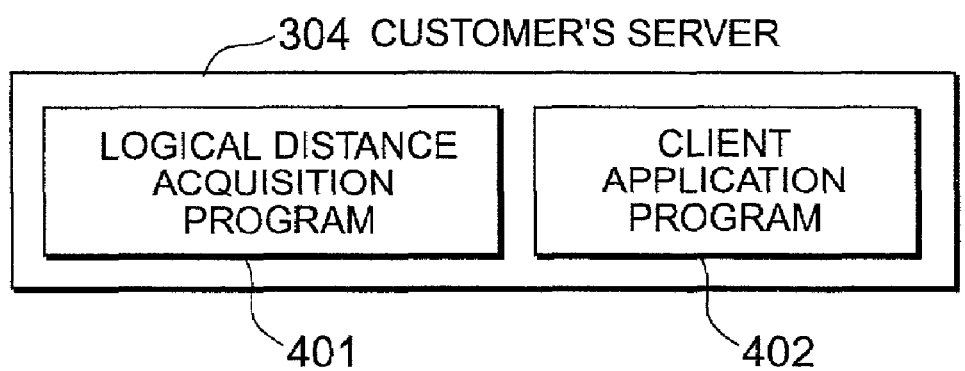

FIG. 2A and FIG. 2B are structural diagrams for illustratively showing both the console 300 and the customer's server 304. The console 300 accesses the WWW server on the Internet, while a request transmission program (Web browser) 400. Also, the console 300 may access the customer's server 304 by using the NFS. In the request transmission program (Web browser) 400, the console 300 accesses both a client positional information input page and a storage resource selection condition input page on the management server 303 so as to perform input setting operations, respectively. Also, while the console 300 accesses a storage state display page, this console 300 may view resource state information such as a capacity, a use ratio, and a throughput as to a storage resource allocated to the customer's server 304. Further, the console 300 may view such information related to a logical distance, and a geographical positional information which may be expressed by latitude and longitude of an installation place. This logical distance corresponds to response time of a packet, and a total hop count indicative of a total stage number of routers through which a packet is transferred.

In the customer's server 304, while a logical distance acquisition program 401 is operated, a Ping program corresponding to a network diagnostic program is executed in a periodic manner with respect to all of the storage units, so that packet response time to the storage resource is measured from a response packet. At this time, a total hop count between the customer's server 304 and the storage resource is acquired, and then, both the measured packet response time and the acquired hop count are notified as a logical distance to the management server 303.

Figure 3:
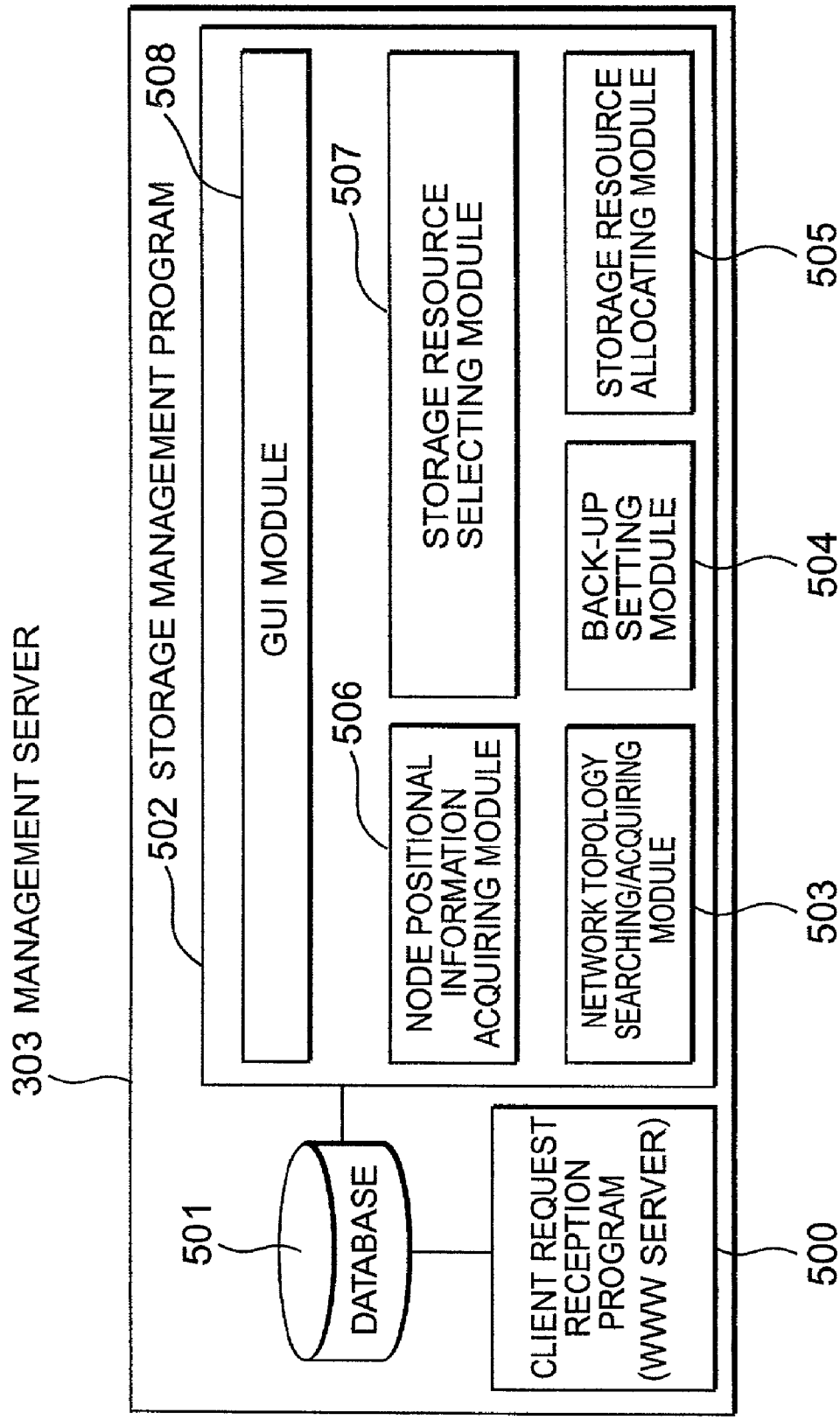
FIG. 3 is a diagram for schematically showing a management server 303.

FIG. 3 is a schematic diagram for showing an internal arrangement of the management server 303. The management server 303 is arranged by a client request reception program (WWW server) 500, a database 501, and a storage management program 502.

The client request reception program 500 corresponds to a WWW server, and transmits a client positional information input page, a storage resource selection condition input page, and a storage state display page to the Web browser. In the client request reception program 500, since a Web page is inputted from the console 300, both a storage resource selection condition and client positional information (latitude and longitude) are acquired.

The storage management program 502 is arranged by a network topology searching/acquiring module 503, a back-up setting module 504, a storage resource allocating module 505, a node positional information acquiring module 506, a storage resource selecting module 507, and a GUI module 508. Both the back-up setting module 504 and the storage resource allocating module 505 are operable in accordance with the existing technique.

In the network topology searching/acquiring module 503, information related to electronic appliances which are connected to the storage networks 308 and 309 provided in the SSP 302 is acquired to be stored in the database 501. Furthermore, another information which is acquired by the logical distance acquisition program 401 operated on the customer's server 304 is also stored into the database 501. In the node positional information acquiring module 506, an installation position (latitude and longitude) of each of the detected storage is acquired via the GUI module 508 so as to calculate a geographical distance. Then, the calculated geographical distance is stored into the database 501. In the storage resource selecting module 508, such a storage resource which may be fitted to both a required capacity and required performance by a client with respect to a storage resource is retrieved, or searched from the database 501 to be selected. In the GUI module 508, while the storage server and the customer's server, which are acquired by the network topology searching/acquiring module 503, are displayed on the display screen, the installation positions, the latitude, and the longitude of the respective nodes are manually inputted from an administrator of the SSP 302.

FIG. 4 is a diagrammatic diagram for showing a storage resource information table 600 related to storage resources stored in the database 501. The storage resource information table 600 contains thereinto a storage name/LUN 601, an averaged operation ratio (%) 602, a capacity (GB) 603, a rotation per minute (rpm) 604 indicative of disk performance, access time (msec) 605 within the disk, packet response time (msec) 606 from a customer's server, an installation place (north latitude, east longitude, location name) of a storage unit, a logical distance (Km) 608 from a customer's server, and a total hop count (stage) 609 between a customer's server and a storage unit. As to this storage resource information table, one information table is formed every customer's server. The storage resource information table 600 is used as a selection factor when a storage resource is selected.

Figure 5:
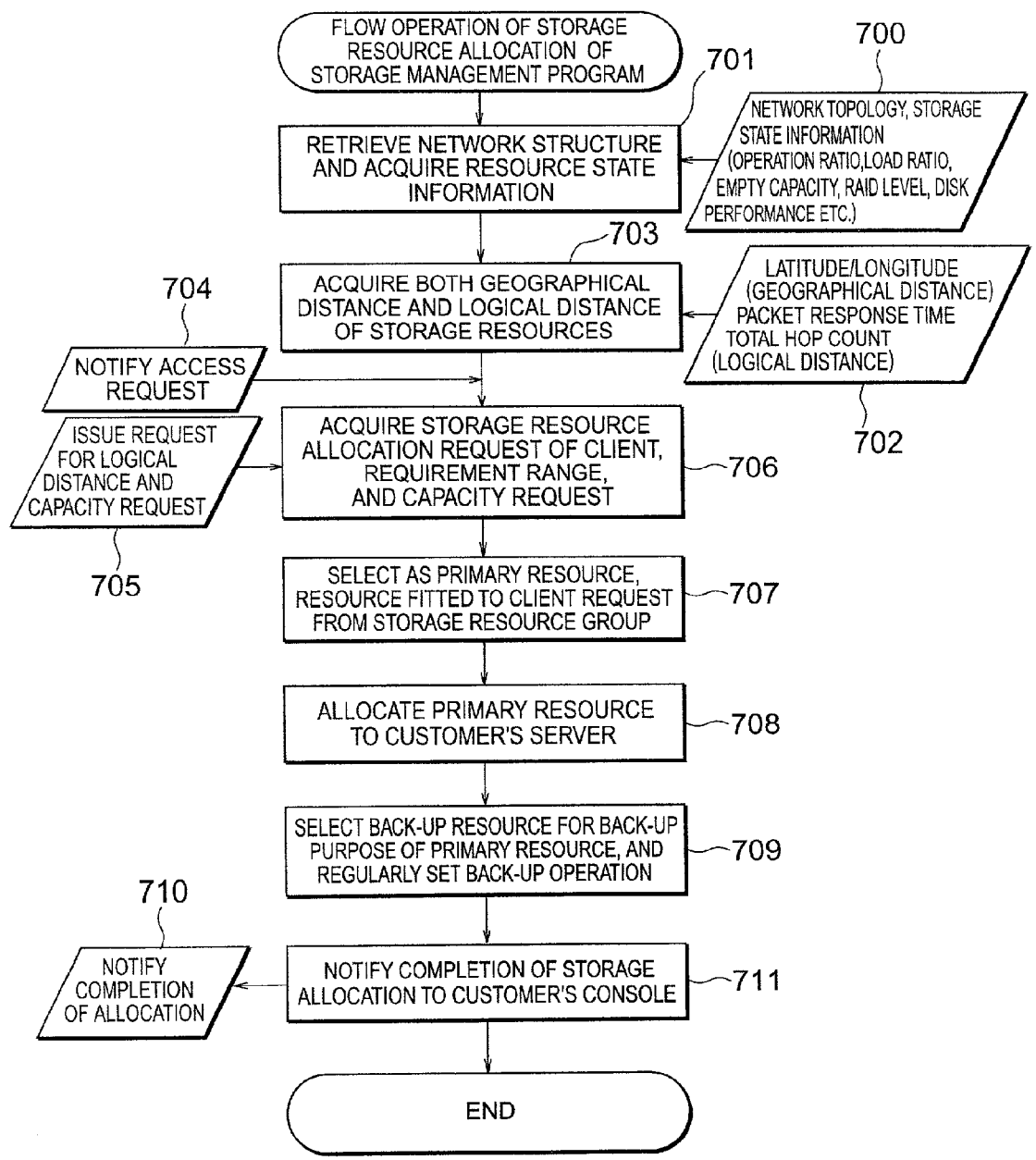
FIG. 5 is a flow chart for explaining operations executed in the case that a storage resource assignment is performed by a storage management program 502.
Figure 6:
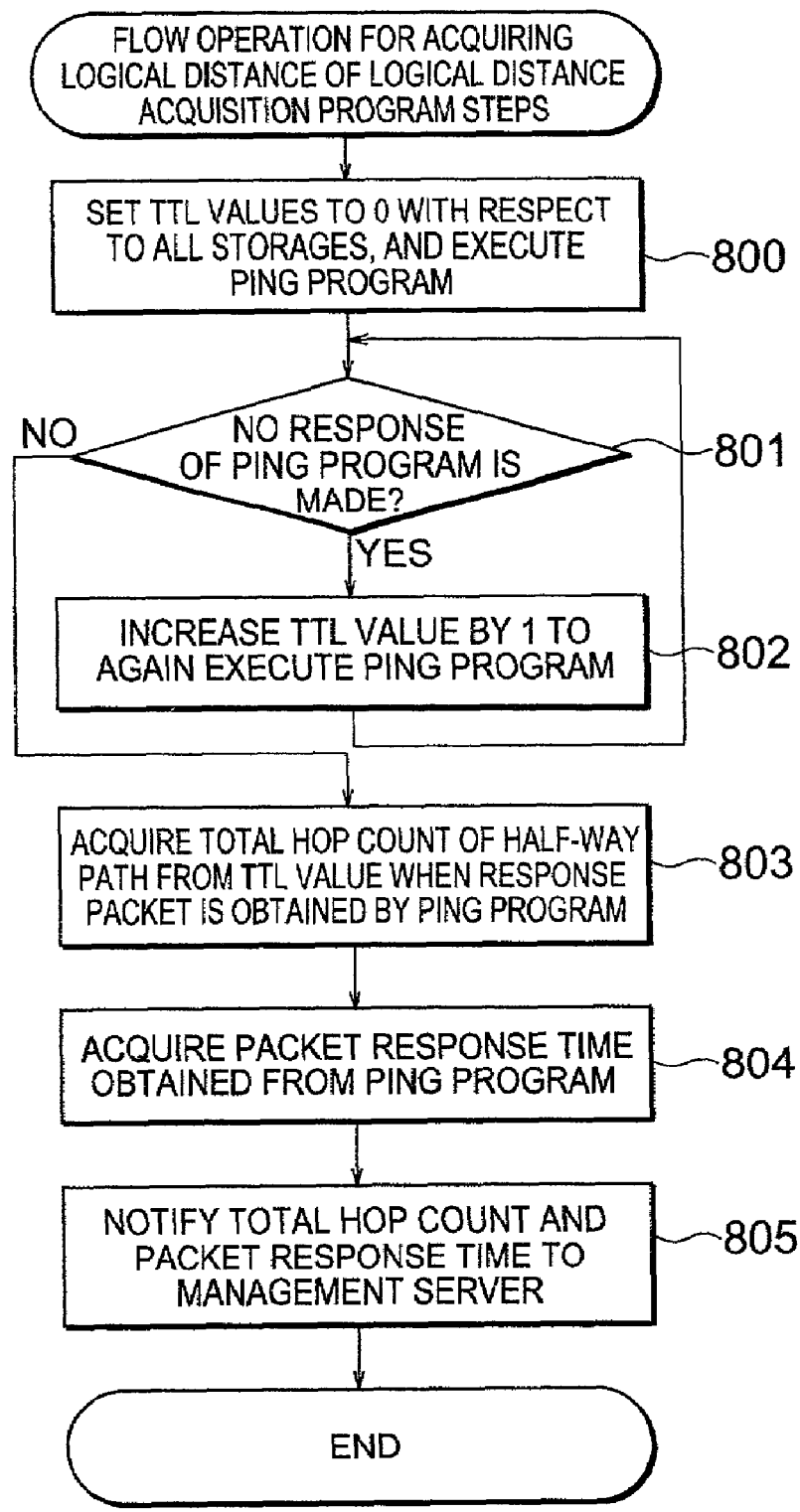
FIG. 6 is a flow chart for describing operations of network logical distance acquisition by a network logical distance acquisition program 402.
Figure 7:
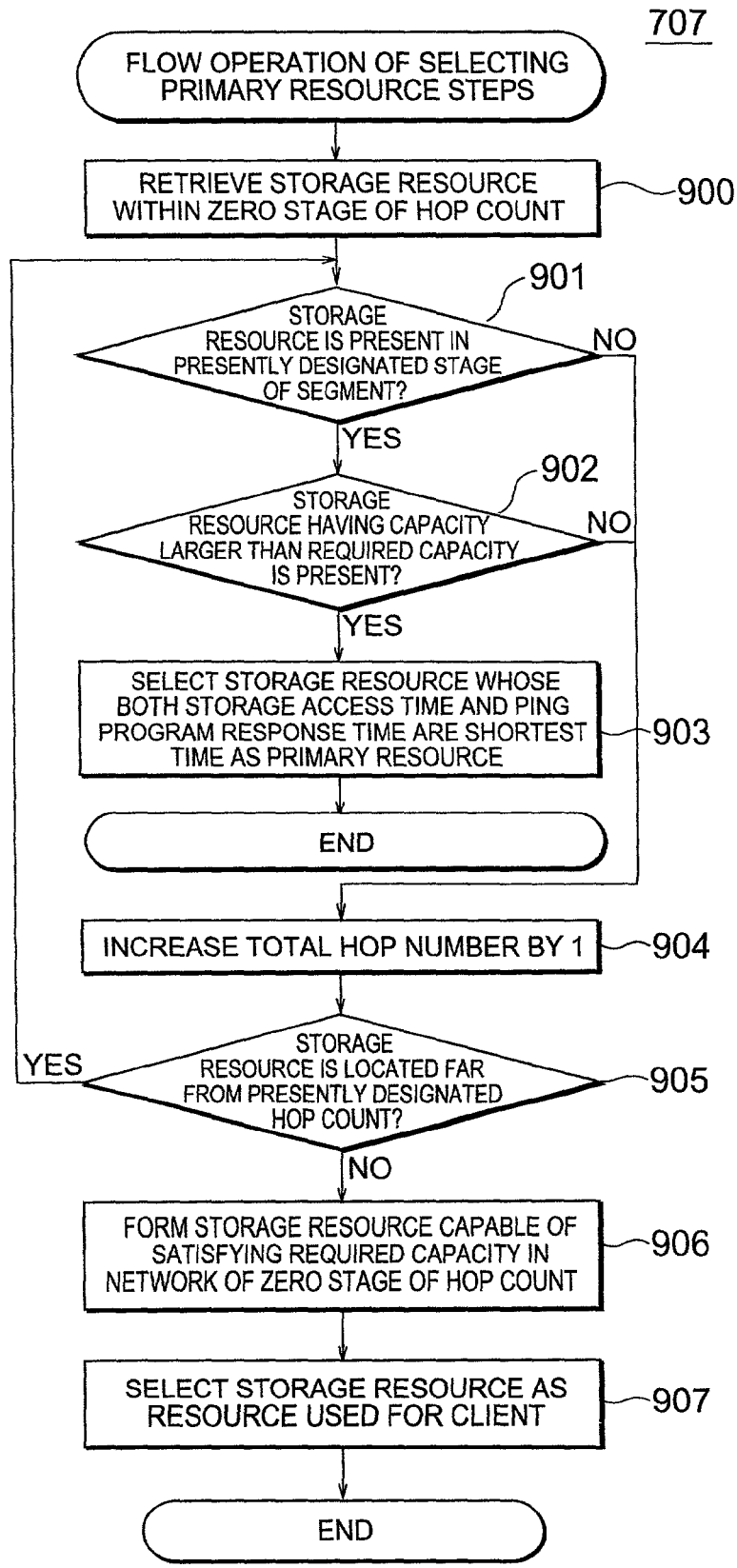
FIG. 7 is a flow chart for explaining storage resource selecting operation by a storage management program 502.
Figure 8:
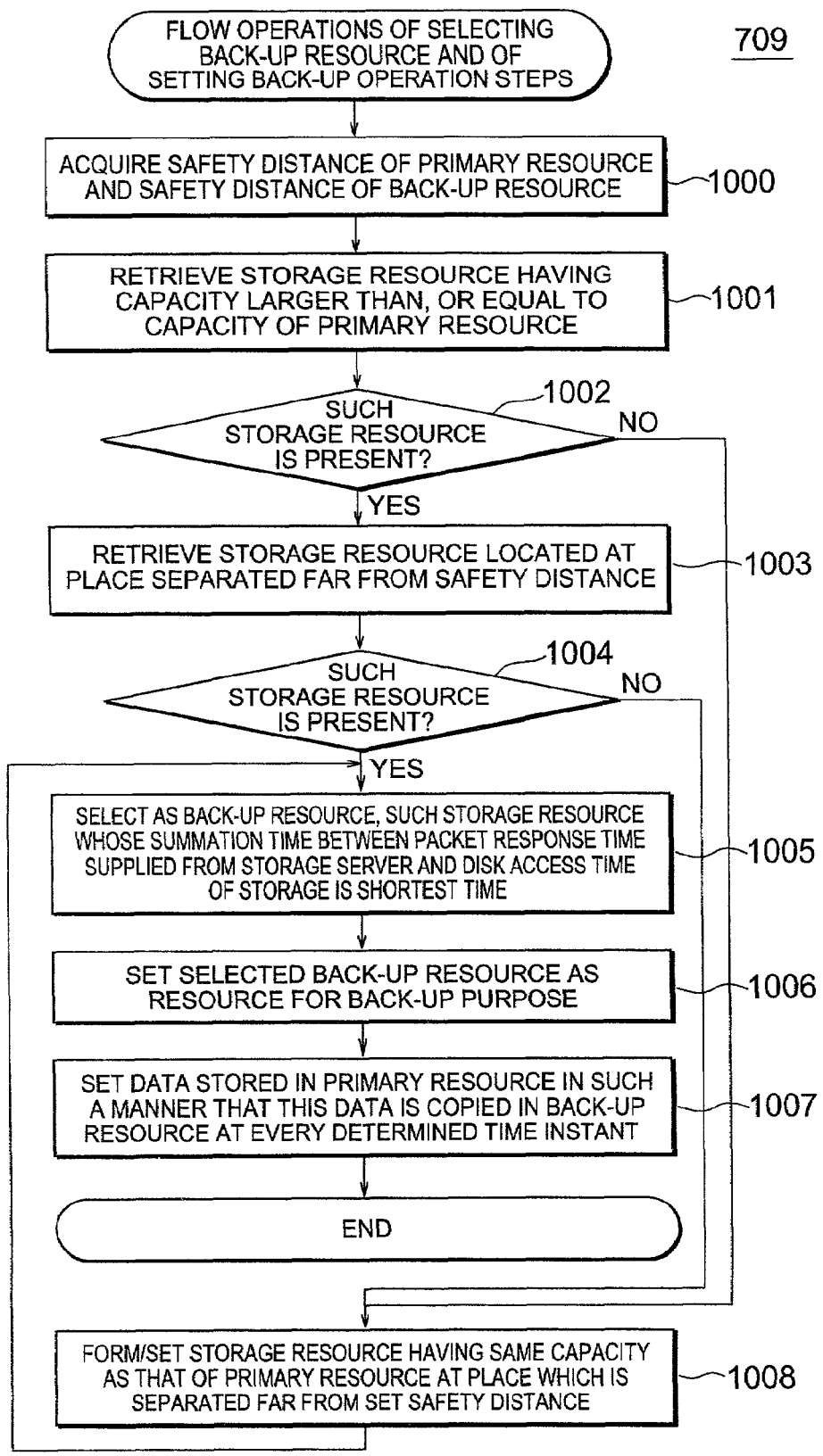
FIG. 8 is a flow chart for describing both back-up resource selecting operation and back-up setting operation by the storage management program 502.
Figure 9:
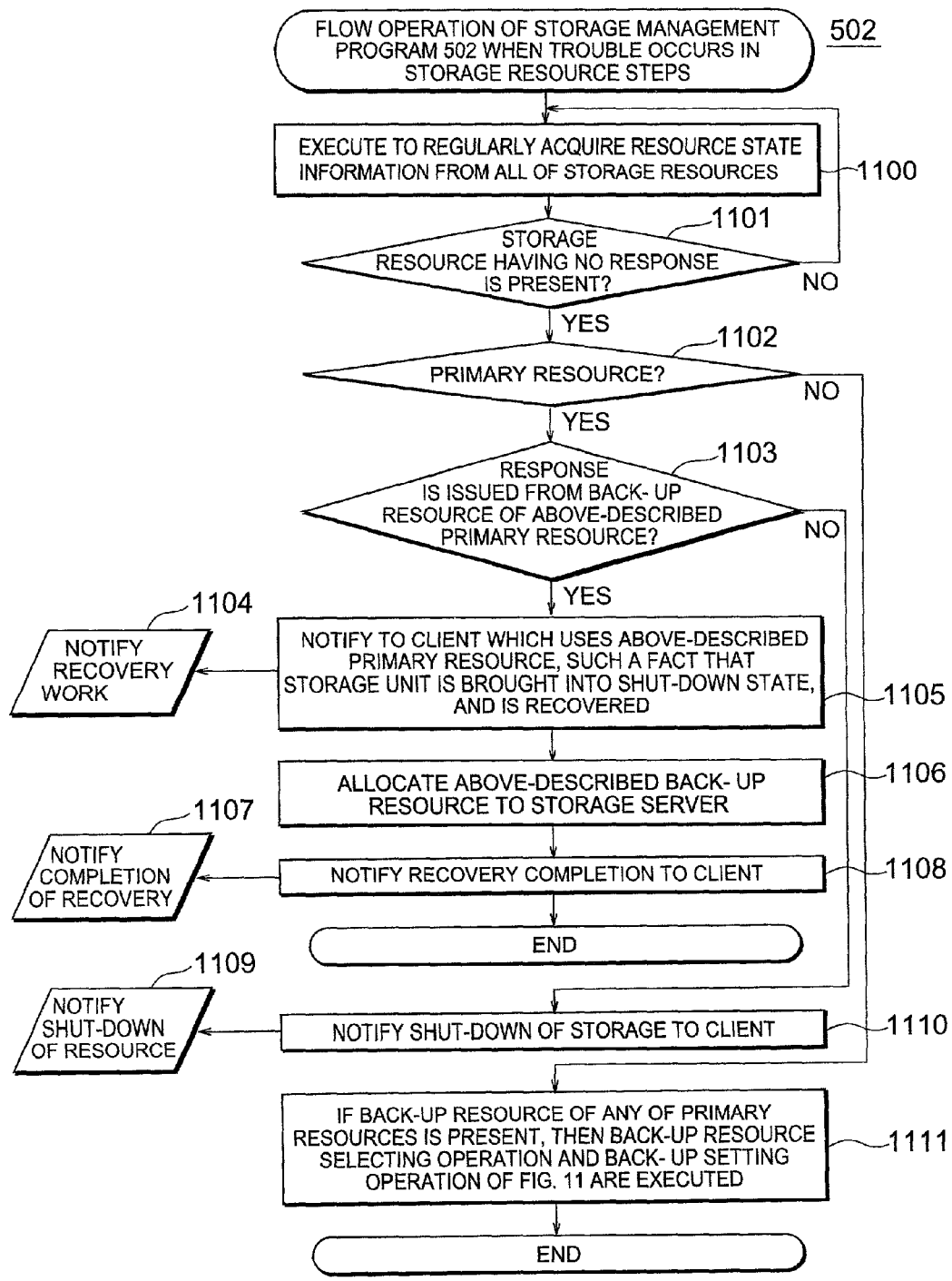
FIG. 9 is a flow chart for explaining operations by the storage management program 502 when a trouble happens to occur.

Referring now to FIG. 5, FIG. 7, and FIG. 8, a description is made of storage resource allocation (assignment) operation flows of the storage management program 502 stored in the management server 303 shown in FIG. 2A and FIG. 2B. An acquisition operation flow of a logical distance defined from a customer's server to a storage resource will now be described with reference to FIG. 6. FIG. 9 is a flow chart for describing operation flows of the storage management program 502 when a trouble happens to occur in a storage resource.

FIG. 5 shows a storage resource allocation operation flow of the storage management program 502. The storage management program 502 searches, or retrieves network topology with respect to the storage network of the SSP 302 (step 700), while using the network topology searching/acquiring module 503, and stores the information related to the network structure into the database 501. Also, the storage management program 502 acquires resource state information 700 such as an operation ratio, a capacity, a disk rotation per minute, and access time within a disk with respect to the found storage resource, and then, stores the acquired resource state information 700 into the information table 600 contained in the database 501 (step 701).

Next, in the node positional information acquisition module 506, both latitude and longitude (geographical distance) are acquired which indicate a geographical place of the storage resource. Both the latitude and the longitude are entered by the administrator of the SSP 302 by employing the GUI module 508. The node positional information acquisition module 506 calculates geographical distances among all of the storage resources, and then stores the calculated geographical distances into the storage resource information table 600. Furthermore, the node positional information acquisition module 506 acquires both packet response time and a total hop count (namely, logical distance) 702 defined between the customer's server 304 and the storage resource from the logical distance acquisition program 401 operable on the customer's server 304, and then, stores the acquired packet response time and total hop number into the storage resource information 600 (step 703).

Then, the above-described data acquisition operation defined in the step 703 is repeatedly carried out every time a constant internal has passed. A flow operation of acquiring a logical distance in the customer's server 304 will be explained later with reference to FIG. 6. Under the above-explained condition, while the client request reception program 500 is executed, the node positional information acquisition module 506 receives a notification 704 for requesting a storage resource assignment issued from a client, and both a required storage capacity 705 and another request with respect to a logical distance defined from the customer's server 304 to the storage resource (step 706). This logical distance corresponds to packet response time, a total hop number, a network throughput, and the like.

In this first embodiment mode, information related to the above-explained data access performance will be referred to as a "logical distance." Such a fact that a logical distance is short may indicate such a condition that time required for data access operation is short, for instance, packet response time is short, a total hop count is small, and a network throughput is high.

A requirement rage 705 in this first embodiment is assumed in that a total hop count is minimum. The storage resource selection module 507 retrieves such a storage resource which is fitted to both the requirement range and the required capacity 705 from the resource state information which has been stored in the database 501, the logical distance, and the geographical distance, and then selects a proper storage resource (step 707). In this first embodiment, an actual distance obtained from a geographical location information will be referred to as a "geographical distance." Furthermore, such a storage resource selected at the step 707 will be called as a primary resource. A storage resource selection flow operation defined in the step 707 will be explained later in detail with reference to FIG. 7.

FIG. 6 is a flow chart of explaining a logical distance information acquisition flow operation by the logical distance acquisition program 401 executed on the customer's server 304. In the logical distance acquisition program 401, when the logical distance is acquired in the step 703 of FIG. 5, both the packet response time and the total hop count are acquired to be provided to the storage management program 502.

In the logical distance acquisition program 402 executed on the customer's server 304, a Ping program is executed from the customer's server with respect to each of these storage resources so as to acquire both packet response time and a total hop count corresponding to a total time of the customer's server which passes over segments. The Ping program originally corresponds to a network diagnostic program capable of diagnosing a network as follows: While data having a constant byte number is transmitted plural times to a designated node, a check is made as to whether or not a response is returned from a node to which data is transmitted in order to diagnose the network.

In order to avoid that a packet present on a network is continuously transmitted, a TTL (Time To live) value indicative of an expiration term is contained in the packet present on the network. This TTL manner is as follows. While a TTL is set when a packet is transmitted, the value of this TTL is subtracted by 1 every time the packet passes through a router, and then, when the value of this TTL becomes 0, this packet is discarded.

A TTL value when a response is firstly obtained may indicate a total stage number of routers up to a target node, namely, a total hop count by using this TTL manner in such a manner that while the TTL value is sequentially increased from 0, a Ping program is executed with respect to the target node. Also, in the Ping program, since data transmission operation is carried out plural times, an average value of packet response time of the respective packets may be acquired. At a first stage, while a TTL value of a storage resource is set to 0, a Ping program is executed (step 800).

A check is made as to whether or not a response by executing the Ping program is received (step S801). When the response is not obtained, the TTL value is increased by 1, and then, the Ping program is again executed (step 802). A series of this process operation is carried out with respect to all of the storage resources. When the response is obtained by executing the Ping program, a total hop count between a customer's server and a storage resource based upon the TTL value (step 803). At the same time, packet response time is required (step 804), and then, both this packet response time and the total hop count are notified to the management server 303.

FIG. 7 is a flow chart for explaining flow operation defined at the primary resource selection step 707 of FIG. 5. In this embodiment, a request of the console 300 is to select such a storage resource, the total hop count of which is the smallest count (step 705 shown in FIG. 5). To this end, the content of the database 501 is retrieved so as to search such a storage resource whose total hop count is equal to 0, namely, a storage resource which is located at the same segment with the customer's server 404 (step 900). In the case that such a storage resource cannot be found out (step 900), the hop count is increased by 1 stage (step 904). Then, a judgement is made as to whether or not there is a storage resource located far from the increased hop count (step 905).

In such a case that the storage resource is present at a segment destination via a designated hop count, or another segment far from this segment destination (step 905), a search is again made as to whether or not a storage resource is present at a segment succeeding to a designated stage number in the step 901. When the storage resource is present at the designated segment in the step 901, a search is made as to whether or not such a storage resource having a capacity larger than, or equal to a capacity required by the client 400 at the segment of the selected hop count (step 902). If such a storage resource cannot be fount out, then a total hop count is increased and then, the searching operation is again performed (step 904). In the step 902, when the storage resources having the capacities larger than, or equal to the required capacity can be found out, such a storage resource among these founded storage resources is selected as the storage resource for the client 400, namely, selected as the primary resource (step 903). That is, this selected storage resource implies that a summation thereof between the average access time within the disk and the packet response time of the Ping program is the fastest time.

In such a case that the storage resource having the capacity larger than, or equal to the target capacity cannot be found out within the SSP 302 in the step 905, such a storage source having a capacity larger than, or equal to the capacity required by the client is formed within the segment whose hop count is "0" from the customer's server (step 906). Then, the formed storage resource is selected as the primary resource (step 907).

FIG. 8 is a flow chart for explaining flow operations defined in the step 709 for selecting the backup resource and for setting the regular back-up operation. In this flow operation, when the primary source malfunctions due to an occurrence of disaster such as an earthquake, the back-up setting operation is carried out in order that data stored in a resource can be recovered.

In this flow operation, first of all, a sufficiently long distance by which disaster does not give an adverse influence to both a back-up resource and a primary resource is acquired as a requirement range of a geographical distance (step 1000). It should be understood that a sufficiently long distance by which disaster never gives an adverse influence will be referred to as a safety distance. Next, such a storage resource having a storage capacity larger than that of a primary resource is retrieved from storage resources except for the primary resource (step 1001). In the case that the above-described storage resource is present (step 1002), another storage resource having a capacity equal to the capacity of the primary resource is formed at a place which is separated from the primary storage by a distance longer than, or equal to the safety distance, and is installed at this place (step 1008).

In the case that the storage resources having the capacities larger than, or equal to the capacity of the primary resource can be found out in the step 1002, a search operation is made as to whether or not there is such a storage resource present at a place located far from the safety distance among the founded storage resources from the storage resource retrieve table 600 (step 1003). To the contrary, in the case that the above-described storage resource cannot be found out, a new storage resource is formed in a similar manner to such a case that the storage resource having the same capacity as the capacity of the primary storage. Then, this newly formed storage resource is installed at a position separated far from the primary resource by a distance longer than the safety distance (step 1008).

Then, next, either in such a case that the storage resource is present at such a place separated from a distance longer than, or equal to the safety distance in the above described step 1004, or in the case that the storage resource is newly formed in the step 1008, such a storage resource is selected as a back-up resource, the summation of which is the fastest. This summation is calculated between the packet response time of the Ping program from the customer's server 304 and the disk access time of the storage (step 1005).

The selected back-up resource is set as a back-up purpose storage in the back-up setting unit 504 (step 1006). Then, such a setting operation is carried out in a step 1007. That is, the data stored in the primary resource is copied to the back-up resource at a predetermined time instant (for example, 0:00 AM every day).

FIG. 9 is a flow chart for describing flow operations of the storage management program 502 in the case that a trouble happens to occur in a storage resource. The storage management program 502 regularly executes the process operation of the step 701 shown in FIG. 5 (namely, retrieve of network structure and acquisition of resource state information) with respect to all of the storage resources even after a series of storage resource assignment process operation has been completed (step 1100). At this time, a check is made as to whether or not there is such a storage resource having no response with respect to the retrieve of the network structure and the request of the resource state information acquisition (step 1101). When there is no such a storage resource, namely the responses are issued from all of the storage resources, the above-explained process operation defined in the step 1100 is repeatedly carried out.

In the case that there is such a storage resource having no response due to a certain trouble in the step 1101, a judgement is made as to whether or not this storage resource corresponds to the primary resource (step 1102). When it is so judged that the storage resource judged in the step 1102 is not equal to the primary resource, another judgement is made as to whether or not this judged storage resource corresponds to the back-up resource of any one of the primary resources. When this judged storage resource corresponds to the back-up resource, the process flow operation for selecting the back-up resource and for setting the back-up resource shown in FIG. 8 is carried out (step 1111).

In the step 1102, in the case that the storage resource having no response corresponds to the primary resource, a confirmation is made as to whether or not there is a response sent from the back-up resource of the primary resource (step 1103). When there is no response from the back-up resource (step 1103), such a notification 1109 that the storage resource is brought into an operation down state is transmitted to the client (step 1110). Even when there is no response from the primary resource, if a response is issued from the back-up resource (step 1103), the below-mentioned notification 1104 is transmitted to such a client which uses the primary resource via the console 300 (step 1105). This notification 1104 notifies that a storage device is brought into an operation down state, and also the storage resource is recovered.

Next, in order that the data used by the customer's server 304 can be again used in the primary resource, the back-up resource is allocated to the customer's server 304 (step 1106). After this back-up resource has been allocated, a recovery notification 1107 is transmitted to the console 300 used by the client by using a client request reception program (WWW server) 500 in a step 1108.

The storage resource operation management method according to this first embodiment mode of the present invention has been described in the above description.

In the above-described first embodiment mode, with respect to the storage resource, while not only the resource state information of the storage resource, but also the logical distance are added as the selection condition, the desirable storage resource is selected. As a result, even when the performance of the storage resource itself is deteriorated, such a storage resource having superior access performance from the customer's server in total performance may be selected. Also, since the geographical distance of such a storage resource was long, this storage resource could not be entered into the selectable storage resource subjects in the prior art. However, since a logical distance of this storage resource is short, this storage resource could be entered as the selectable storage resource subjects. As a result, the storage resource operation management capable of providing the proper storage resource to the client could be realized among the storage resources which are distributed over the broad range.

Also, while the safety range is set as the disaster influence range with respect to the storage resource under use, the back-up storage resource could be formed with respect to such a storage resource located far from the safety distance. As a result, with respect to the disaster such as an earthquake, the storage resource operation management having the high disaster-resistant performance could be realized.

Next, a description will now be made of a modification with respect to the above-described embodiment modes.

(1). In the above-explained first embodiment, the storage resource selection condition from the client is defined by that the network up to the storage resource is the minimum hop count. Also, the selection condition of the back up resource is defined by that the back-up resource should be located far from the safety distance. However, in accordance with the present invention, there is no limitation in the content of the request, and also in the range. Alternatively, the range of the request may be defined as follows: That is, time required for data access operation may be defined within 1 second; a total hop count between a storage resource and a node may be selected to be smaller than, or equal to three stages; a throughput may become higher than, or equal to 50 Mbps; a storage resource may be installed within 1 Km, and so on.

(2). In the above-described first embodiment mode, in such a case that such a storage resource fitted to the selection condition cannot be founded out as the back-up resource at the distance far from the safety distance, another storage resource fitted to the selection condition is newly formed (step 1008).

However, another method may be employed. That is, while the storage resource is not newly formed, another storage resource may be selected from the storage resources present in the SSP, which is located closer than the safety distance, and is installed at a place separated from the closest distance from the safety distance.

(3). In the above-described first embodiment mode, when the client uses the storage resource, the customer's server 304 is installed in the SSP 302, and the client uses this storage resource via the customer's server 304. Alternatively, while the customer's server is installed in the client office, this customer's server may be directly connected to the SAN provided in the SSP so as to use the storage resource.

(4). In the first embodiment mode, while both the client request reception program 500 and the storage management program 502 are initiated on the management server 303, the database 501 is constituted. Alternatively, another structure may be employed. That is, the customer's server 402 may also have the function of the management server 403 in such a manner that while both the client request reception program 500 and the storage management program 502 are operable on the customer's server 402, the database 501 is constructed.

(5). In the above-described first embodiment mode, the logical distance acquisition program 401 operated on the customer's server 304 executes the Ping program with respect to the storage so as to measure both the packet response time and the total hop count between the customer's server and the storage resource. Alternatively, this logical distance acquisition program may execute the Ping program with respect to not only the storage resource but also the console 300 of the client so as to measure the packet response time between the console 300 and the storage resource. As to a logical distance and a geographical distance, a plurality of nodes and/or a network may be interposed between a node and a storage resource, or between storage resources. In this alternative case, the logical distance may express such a total logical distance defined from the console via the customer's server to the storage resource.

(6). In the above-described first embodiment mode, when the logical distance is acquired, the Ping program is used. However, the present invention is not limited to such a method for acquiring the logical distance. Alternatively, other methods may be employed. That is, a method may be employed by that while data is actually written, or is actually read with respect to a storage resource, time required to access data may be acquired. Also, another method may be employed by that a total hop count up to a storage resource is used, and/or a throughput of switches provided in a half way of a route is used.

(7). In the above-described embodiment mode, when the logical distance between the storage resources is acquired, the administrator of the SSP 302 manually enters both the latitude and the longitude of each of the storages from the GUI module 508 of the storage management program 502 operable on the management server 403. Alternatively, another method may be employed by that such information (namely, logical distance) used to indicate a geographical location relationship is entered by designating an address, or by selecting a point on a map which is commonly owned, while such latitude and longitude are not used. Also, a further method may be alternatively employed. That is to say, even in such a when latitude, longitude, and altitude are used so as to acquire a logical distance, while a GPS (Global Positioning System) receiver is additionally mounted on each of the storage resources, latitude/longitude/altitude of these storage resources may be acquired from the GPS satellites. In this alternative case, the management server 303 is required to acquire the respective longitude/latitude/altitude of all of the storage resources.

(8). In the above-explained first embodiment mode, with respect to the new storage source assignment request issued from the client, the management server 303 selects the optimum storage resource which can satisfy the requirement of the client, and then, the selected optimum storage resource to the customer's server 304. However, the present invention is not limited only to the methods of selecting and allocating the storage resources. Alternatively, in the case that the network structure is changed under such a condition that the storage resource has already been determined with respect to the customer's server, another method may be employed by judging as to whether or to the request of the customer's server is satisfied with respect to the storage resource even after the network structure has been changed.

Figure 10:
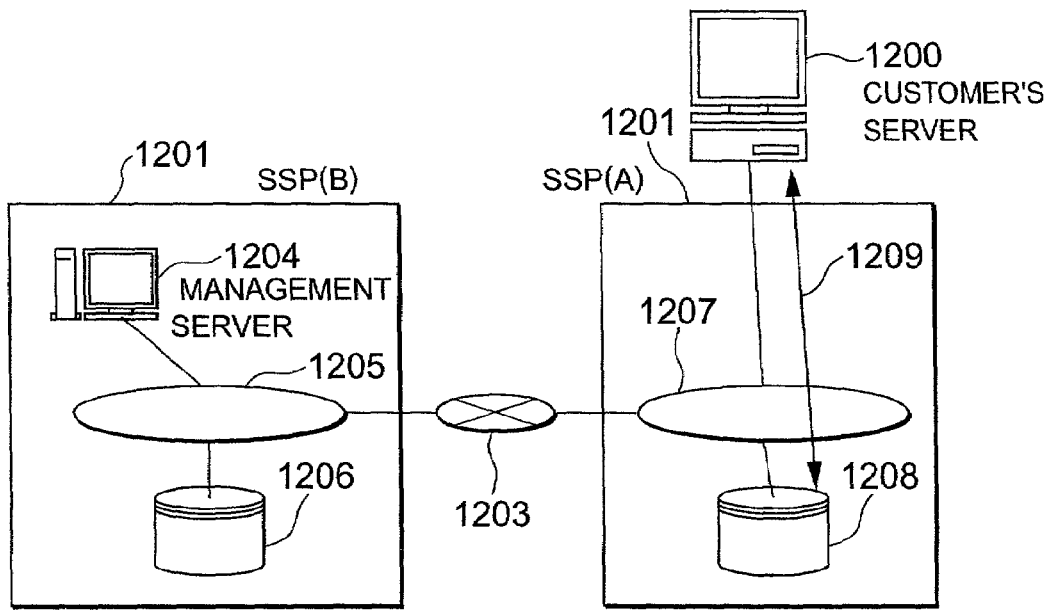
FIG. 10 is a network structural diagram for representing a relationship between SSPs (A, B) and a customer's server 1300, to which a second embodiment mode of the present invention is applied.

FIG. 10 illustratively shows a network structure according to a second embodiment mode of the present invention, for correcting a storage resource managing method as the above-described method of judging as to whether or not the requirement range can be satisfied as explained in the above item (8), and for correcting a topology as explained in the above item (3).

The network structure shown in FIG. 10 is arranged by a customer's server 1200, an SSP(A) 1201, and an SSP(B) 1202. Both the SSP(A) 1201 and the SSP(B) 1202 represent a branch (A) and another branch (B) contained in a single SSP. While a VPN (Virtual Private Network) is formed on the Internet 1203, both the SSP(A) 1201 and the SSP(B) 1202 are connected to this VPN. Although the SSP(A) 1201 and the SSP(B) 1202 are installed in different areas, managements of both the SANs 1205 and 1206 are carried out in a batch mode by an administrator 1204 of the SSP(B) 1202. The SSP(B) 1202 is arranged by a management server 1204 for managing storages of the entire SSP, the SAN 1205, and a storage 1206. The SSP(A) 1201 is arranged by an SAN 1207 and a storage 1208. The customer's server 1200 is directly connected to the SAN 1207.

The customer's server 1200 is installed by a client within a firm of this client. This customer's server 1200 corresponds to a node used to access from the own client to a storage resource of the SSP(B) 1202. Also, this customer's server 1200 may have the same function as a console. An arrow 1209 indicates a logical distance between the customer's server 1200 and the storage resource 1207 contained in the storage device 1206. The management server 1204 owns a database 501, and in this management server 1204, both the client request reception program 500 and the storage management program 502 of the above-explained first embodiment mode shown in FIG. 4 are operated. The storage management program 502 owns a movement necessary/unnecessary judging module in addition to the processing modules shown in FIG. 3.

In the customer's server 1200, the data access time acquisition program 600 shown in FIG. 4 is operated.

While the customer's server 1200 allocates the resources within the storage 1208 in accordance with the storage resource allocation flow operation shown in FIG. 5 in the above-described first embodiment mode, this customer's server 1200 uses the allocated resource.

In this second embodiment mode, logical distance information is measured based upon a total hop count (namely, total stage number of routers) between the customer's server 1200 and the storage resource. Then, a requirement range of a client is limited to two stages of the hop count within the logical distance.

Figure 11:
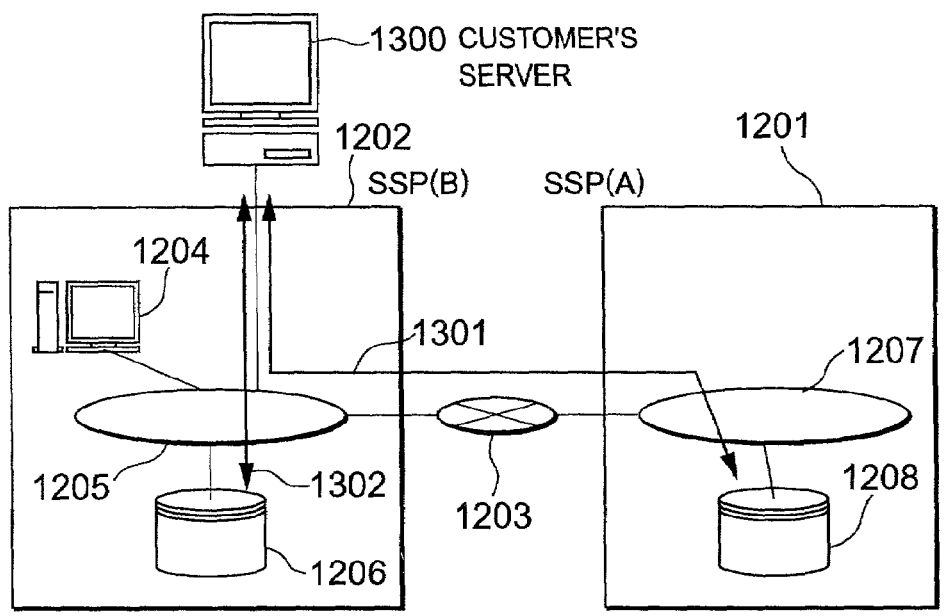
FIG. 11 is a network structural diagram in the case that the customer's server is moved from the network structure of FIG. 10 to which the second embodiment mode is applied.

FIG. 11 illustratively shows a network structure in the case that the client moves in the network structure of FIG.

10, and then, the customer's server 1200 is transferred to anther customer's server 1300. The customer's server 1300 shows such a condition that the customer's server 1200 shown in FIG. 10 has moved. Both an SSP(A) 1201 and an SSP(B) 1202 are identical to both the SSP(A) 1201 and SSP(B) 1200 shown in FIG. 10. The customer's server 1300 and directly connected to the SAN 1205 employed in the SSP(B) 1202. An arrow 1301 represents a logical distance (total hop count) between the customer's server 1300 and the storage resource employed in the storage unit 1208. An arrow 1302 indicates a logical distance (total hop count) between the customer's server 1300 and the storage device 1206.

Figure 12:
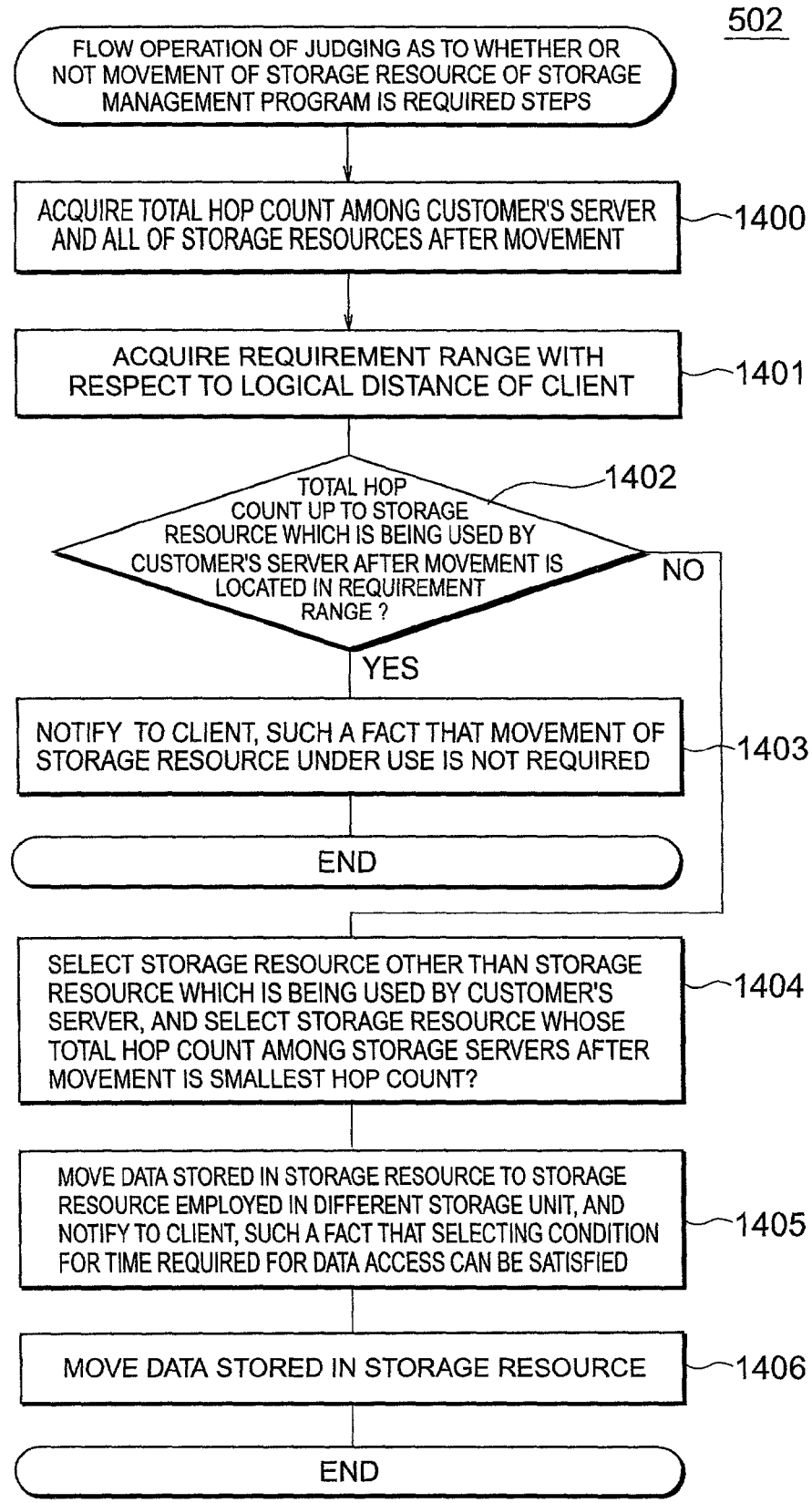
FIG. 12 is a flow chart for describing operation for judging as to whether or not the storage resource of the storage management program 502 must be moved.
Figure 13:
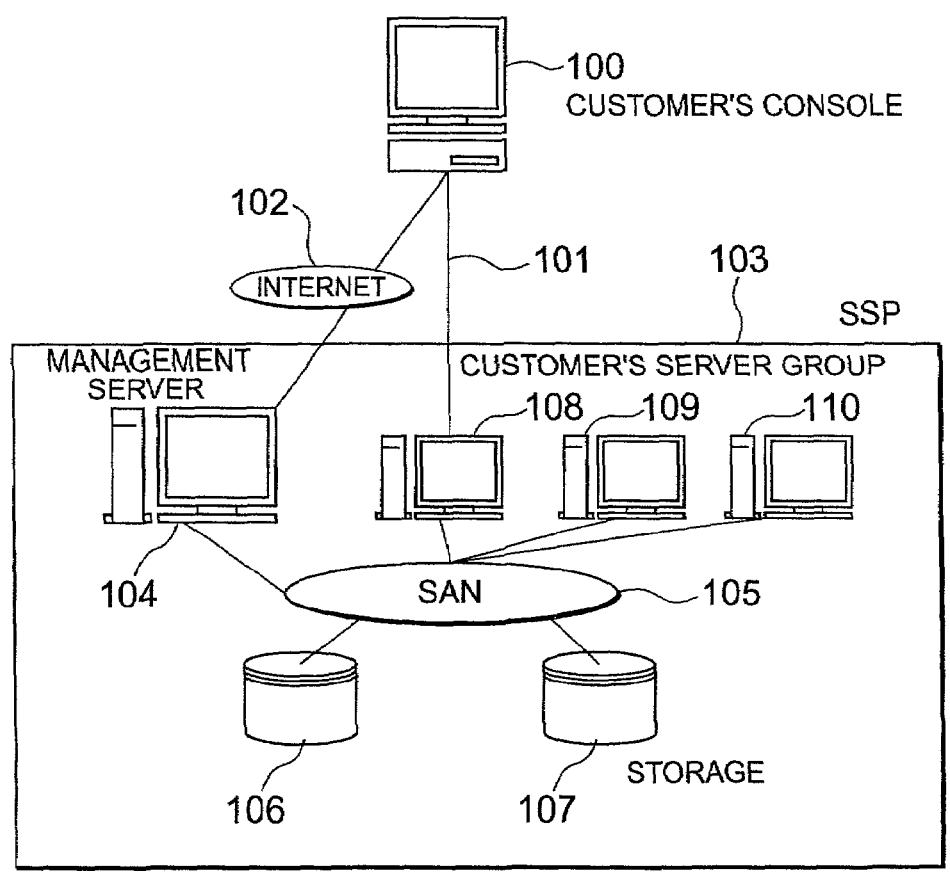
FIG. 13 is the network structural diagram for indicating the operation mode of the conventional SSP 102.
Figure 14:
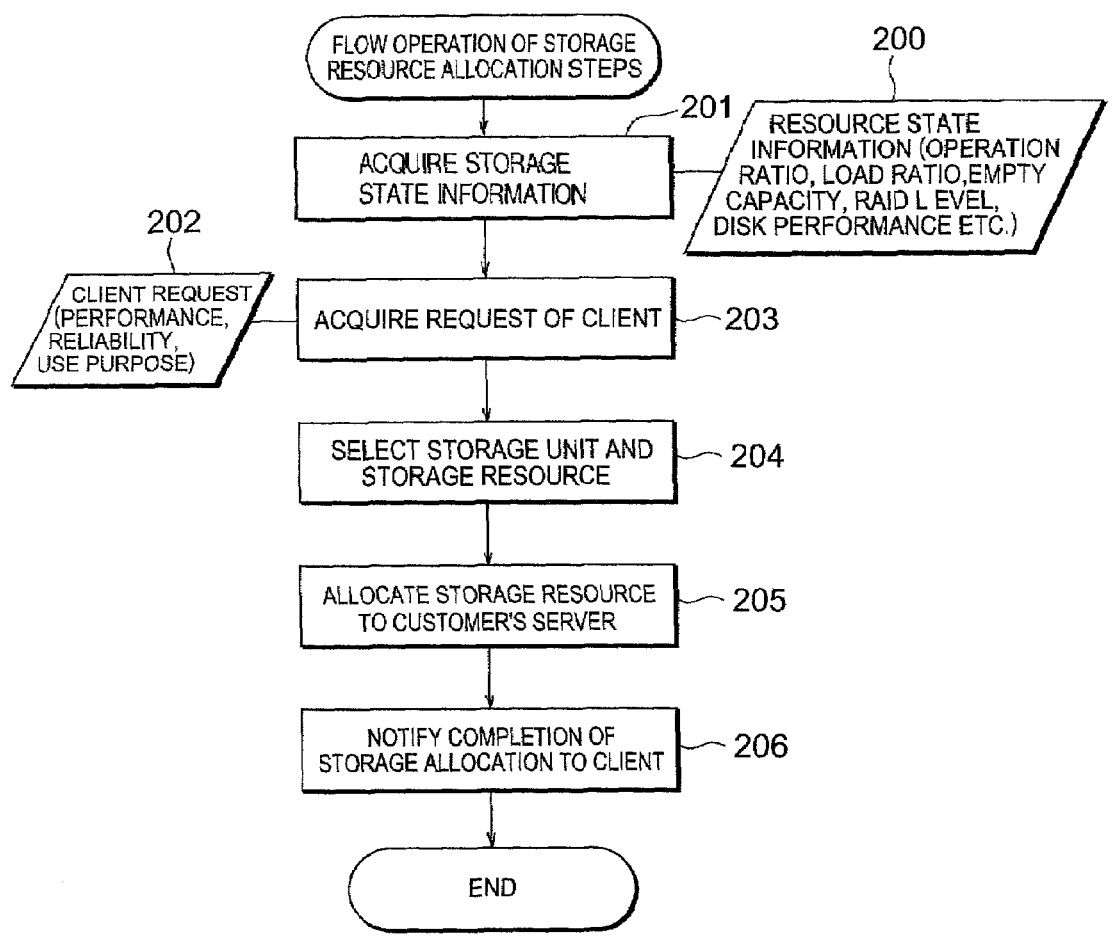
FIG. 14 is the flow chart for explaining the storage resource assignment executed by the storage management program in the prior art.

FIG. 12 is a flow chart for describing process flow operation for judging as to whether or not movement of a storage resource is required when a customer's server moves in the storage management program 502.

In the storage management program 502, in the case that a movement notification is received from the customer's server 1300 which also owns the console, a total hop number defined from the customer's server 1300 after has moved up to all of the storage resources (step 1400).

Next, the customer's server 1200 before having moved sets the acquired hop counts with respect to the storage management program, and then, acquires a requirement range stored in a database, namely a storage resource selection condition (smaller than two hop counts) in a step 1401. Next, this acquired hop count is compared with a hop count 1302 between the customer's server 1300 after having moved and the storage resource 1208 which has been used having before moved.

After the customer's server 1300 has moved, if the total hop count is smaller than two stages (step 1402), then requirement performance of the client with respect to the storage resource can be satisfied. As a result, the storage management program 502 judges that movement of the data within the storage resource is not required, and then, notifies this judgement result to the customer's server 1300 after having moved (step 1403). In the step 1402, in such a case that a total hop number is not present within the range of the selection condition, a storage device whose total hop number is minimum is selected from such storage resources other than the storage device 1208 which has been used by the customer's server 1200 (step 1404). Then, the storage management program 502 notifies the movement of the data stored within the storage resource to the customer's server 1300 after having moved (step 1405), and then the data stored within the storage resource is actually moved (step 1406).

The storage resource management method according to the second embodiment mode of the present invention has been described in the above description.

In accordance with the above-explained second embodiment, when the geographical location of the customer's server is moved, if the total hop count between the customer's server and the storage resource is smaller than the requirement range (within two stages of total hop count) of the client, then such a judgement is made that the movement of the data stored in the storage resource is not required. As a consequence, reductions in the work cost required for the data movement can be realized in the storage resource operation movement.

As previously described in detail, in accordance with the present invention, in the case that the desirable storage resource is selected from the storage resource groups which are spread in the wide range and then, the selected storage resource is allocated to the nodes which use the storage resources, this selection can be carried out by adding the logical distance to the resource state information stored in the storage. This resource state information corresponds to the empty capacity and the use ratio. This logical distance corresponds to the formation related to the data access performance, and the geographical distance. As a consequence, even when one storage resource whose resource state information is inferior than that of another storage resource, since the data access performance via the network becomes superior, such a storage resource having the best access performance can be selected by such a node which uses the storage resource. As a result, such a storage network operation can be realized by which such an optimum storage resource which can be fitted to the requirement range with respect to the storage resource can be selected with respect to the request and can be provided.

Also, with respect to the storage resource which is used by the server of the client, such a distance (namely, safety distance) is set by which the disaster such as an earthquake never gives the adverse influence. Then, the storage resource which is installed at the place separated far from the set safety distance is selected, and then, the selected storage resource can be set as the back-up storage resource. Under this condition, in the case that the primary storage resource is damaged by such local disaster as an earthquake and a flood, the back-up purpose storage resource which is not damaged by the disaster is allocated to the server of the client by which the data can be maintained. As a consequence, it is possible to realize such a disaster receivable storage network managing method.

Furthermore, while the logical distance up to the storage resource is acquired, the requirement range can be acquired. As a result, even in such a case that the geographical installation position of the server of the client which uses the storage resource is moved and thus the distance between this storage resource and the server is increased, the change in the logical distances can be measured. As a result, after the geographical installation location of the server has been moved, it is possible to judge as to whether or not the logical distance up to the storage resource is located within the requirement range. Then, when the logical distance is not varied, it is possible to judge that the movement of the storage resource is not required. As a consequence, the work cost required for the unnecessary movement can be reduced from the storage network operation management cost.

It will be further understood by those skilled in the art that the foregoing description has been made on embodiments of the invention and that various changes and modifications may be made in the invention without departing from the spirit of the invention and scope of the appended claims.

What is claimed is:

1. In a storage network which is arranged by a node for transmitting an access request via a network to a storage, a storage group constituted by at least one storage resource which receives said access request so as to execute a content of the access request, and a management server, said management server comprising:
    means for acquiring at least one of a logical distance and a geographical distance from at least one of said node and said storage resources contained in said storage group, and said storage resources contained in said storage group,
    wherein said logical distance is generated based on installation information regarding installation of each of said node and said storage resources, and wherein said geographical distance is generated based on information of a physical location of each of said node and said storage resources;

means for acquiring from said node a requirement range with respect to at least one of said logical distance and said geographical distance; and means for selecting at least one storage resource for executing the access request, issued by said node, from said storage group, while at least one of said requirement range with respect to said logical distance and said requirement range with respect to said geographical distance is set as a selecting condition.

2. A storage resource operation managing method in a storage network arranged by a node for transmitting an access request via a network to a storage and by a storage group constituted by at least one storage resource which receives said access request so as to execute a content of the access request, said storage resource operation managing method comprising the steps of:

acquiring at least one of a logical distance and a geographical distance from at least one of said node and said storage resources contained in said storage group, and said storage resources contained in said storage group, wherein said logical distance is generated based on installation information regarding installation of each of said node and said storage resources, and wherein said geographical distance is generated based on information of a physical location of each of said node and said storage resources;

acquiring from said node a requirement range with respect to at least one of said logical distance and said geographical distance; and selecting at least one storage resource for executing the access request, issued by said node, from said storage group, while at least one of said requirement range with respect to said logical distance and said requirement range with respect to said geographical distance is set as a selecting condition, wherein in such a case that the storage resource located within said requirement range is not present within said storage group, such a storage resource is selected whose at least one of said logical distance and said geographical distance is closer than those of another storage resource from said storage group.

3. A storage resource operation managing method in a storage network arranged by a node for transmitting an access request via a network to a storage and by a storage group constituted by at least one storage resource which receives said access request so as to execute a content of the access request, said storage resource operation managing method comprising the steps of:

acquiring at least one of a logical distance and a geographical distance from at least one of said node and said storage resources contained in said storage group, and said storage resources contained in said storage group, wherein said logical distance is generated based on installation information regarding installation of each of said node and said storage resources, and wherein said geographical distance is generated based on information of a physical location of each of said node and said storage resources;

acquiring from said node a requirement range with respect to at least one of said logical distance and said geographical distance; and selecting at least one storage resource for executing the access request, issued by said node, from said storage group, while at least one of said requirement range with respect to said logical distance and said requirement range with respect to said geographical distance is set as a selecting condition, wherein in such a case that the storage resource located within said requirement range is not present within said storage group, such a storage resource is newly added whose at least one of said logical distance and said geographical distance is located within said requirement range.

4. A storage resource operation managing method in a storage network arranged by a node for transmitting an access request via a network to a storage and by a storage group constituted by at least one storage resource which receives said access request so as to execute a content of the access request, said storage resource operation managing method comprising the steps of:

acquiring at least one of a logical distance and a geographical distance from at least one of said node and said storage resources contained in said storage group, and said storage resources contained in said storage group, wherein said logical distance is generated based on installation information regarding installion of each of said node and said storage resource, and wherein said geographical distance is generated based on information of a physical location of each of said node and said storage resources;

acquiring from said node a requirement range with respect to at least one of said logical distance and said geographical distance; and selecting at least one storage resource for executing the access request, issued by said node, from said storage group, while at least one of said requirement range with respect to said logical distance and said requirement range with respect to said geographical distance is set as a selecting condition.

5. The storage resource operation managing method as claimed in claim 4, wherein as said storage resource selecting condition, at least one storage resource is selected which is located within said requirement range of at least one of said logical distance and said geographical distance.

6. The storage resource operation managing method as claimed in claim 5, wherein within at least on storage resource located in said requirement range, at least such one storage resource is selected whose at least one of said logical distance and said geographical distance is closer than those of other storage resources.

7. The storage resource operation managing method as claimed in claim 5, wherein within at least one storage resource located in said requirement range, at least such one storage resource is selected, the geographic distance of which is far from the geographical distance of another storage resource.

8. The storage resource operation managing method as claimed in claim 4, wherein with respect to at least a first storage resource contained in said storage group, a requirement range with respect to a geographical distance from said first storage resource is acquired;

a second storage resource is selected from said storage group located within the requirement range with respect to said geographical distance from said first storage resource, or a second storage within the requirement range with respect to said geographical distance from said first storage resource;

copied data as to at least a data portion of such data stored in said first storage resource is stored into said second storage resource; and in the case that an occurrence of a trouble of said first storage resource is detected, the access request issued from said node, which is transmitted to said first storage resource, is executed with respect to said copied data of the data stored in said second storage resource.

9. The storage resource operation managing method as claimed in claim 4, further comprising the steps of:

in such a case that a geographical location of said node is changed from a first setting position to a second setting position judging whether or not a logical distance defined from said node set at the second setting position up to such a storage resource which executes an access request transmitted by said node is located within said requirement range; and moving data in said storage resource into another storage resource, when the logical distance from said second setting position is located is beyond said requirement range.

10. In a network system including a plurality of storage resources and at least one of computers being coupled to said storage devices via a network for using data stored in said storage resource, a storage resource managing method comprising the steps of:

acquiring storage resource information including at least one of a logical distance and a geographical distance between at least one of said computers and each of said storage resources, wherein said logical distance is generated based on installation information regarding installation of each of said node and said storage resources, and wherein said geographical distance is generated based on information of a physical location of each of said node and said storage resources;

acquiring an allocation request for assigning storage resource to said computer based on a requirement range with respect to at least one of said logical distance and said geographical distance; and allocating, to said computer, a storage resource corresponding to said acquired storage resource information and said requirement range included in said allocation request storage resource.

11. The storage resource managing method according to claim 10, wherein the step of allocating comprises the step of:

if the storage resource located within said requirement range is not present, allocating at least one storage resource that does not satisfy said requirement range based on the acquired storage resource information.

12. The storage resource managing method according to claim 11, wherein the allocated at least one storage resource that does not satisfy said requirement range is a storage resource wherein a difference between information regarding a storage device forming the allocated at least one storage resource and said requirement range is smaller than a difference between information regarding devices forming other storage resources that do not satisfy said requirement range.

13. The storage resource managing method according to claim 11, wherein at least one of said logical distance and said geographical distance of the allocated at least one storage resource is closer than those of the other storage devise -resource that does not satisfy said requirement range.

14. The storage resource managing method according to claim 11, wherein at least one of said logical distance and said geographical distance of the allocated at least one storage resource is farther than those of the other storage devise -resource that do not satisfy said requirement range.

15. The storage resource managing method according to claim 11, wherein the step of allocating comprises the step of:

if the storage resource located within said requirement range is not present, adding at least one of new storage resources that satisfy said requirement range and allocating at least one of said new storage resources.

16. The storage resource managing method according to claim 10, further comprising the steps of:

if a geographical location of said computer is changed from a first location to a second location, judging whether or not a logical distance between said computer in said second location and said allocated storage resource is within said requirement range;

if said logical distance between said computer is said second location and said allocated storage resource is beyond said requirement range, adding a storage resource that satisfies said requirement range; and moving data to the added storage resource.

17. The storage resource operation managing method according to claim 4, wherein said installation information includes an operation ratio, a storage capacity, a rotation per minute of disk, an access time in disk, a packet response time, and a hop number.

18. The storage resource operation managing method according to claim 4, wherein said information of said geographical distance is based on a latitude and a longitude of each of said node and storage resources.

* * * * *